United States Patent [19]

Hunsberger et al.

[11] Patent Number: 5,239,602
[45] Date of Patent: Aug. 24, 1993

[54] FIBER OPTIC CONNECTOR

[76] Inventors: Daniel Hunsberger, 728 Ridge Rd.; Lloyd Detwiler, 37 Daniels Rd., both of Sellersville, Pa. 18960

[21] Appl. No.: 893,290
[22] Filed: Jun. 4, 1992
[51] Int. Cl.⁵ .............................................. G02B 6/38
[52] U.S. Cl. ..................................... 385/62; 385/69; 385/70
[58] Field of Search ....................... 385/62, 66, 68, 69, 385/70

[56] References Cited

U.S. PATENT DOCUMENTS

| | | | |
|---|---|---|---|
| 4,097,129 | 6/1978 | Wellington et al. | 385/70 |
| 4,188,087 | 2/1980 | D'Auria et al. | 385/78 |
| 4,212,514 | 7/1980 | Prunier et al. | 385/73 |
| 4,236,787 | 12/1980 | Iacono et al. | 385/66 |
| 4,320,938 | 3/1982 | Gunnersen et al. | 385/59 |
| 4,325,607 | 4/1982 | Carlsen | 385/70 |
| 4,458,983 | 7/1984 | Roberts | 385/81 |
| 4,730,892 | 3/1988 | Anderson et al. | 385/70 |
| 4,767,178 | 8/1988 | Sasaki et al. | 385/92 |
| 4,793,683 | 12/1988 | Cannon, Jr. et al. | 385/75 |
| 4,807,957 | 2/1989 | de Jong et al. | 385/60 |
| 4,812,003 | 3/1989 | Dambach et al. | 385/12 |
| 4,812,006 | 3/1989 | Osborn et al. | 385/78 |
| 4,824,198 | 4/1989 | Anderton | 385/70 |
| 4,838,640 | 6/1989 | Anderton | 350/96.2 |
| 5,129,023 | 7/1992 | Anderson et al. | 385/70 |

*Primary Examiner*—Frank Gonzalez
*Attorney, Agent, or Firm*—Caesar, Rivise, Bernstein, Cohen & Pokotilow

[57] ABSTRACT

A connector for a pair of loosely buffered or tightly buffered optic fiber cables. Each of the cables comprises an optic fiber having a jacket thereabout and a bare free end. The connector comprises a first section, a second section, and a pair of jacket clamps. Each of the first and second sections are arranged to receive a respective one of the cables. The jacket clamps engage respective ones of the jackets to hold the cables in place. The first section has a fiber retaining, conical member located therein. That member is formed of a substantially hard, yet somewhat compressible material, and includes a fiber-receiving bore extending therethrough. The internal diameter of the bore is very slightly larger than the external diameter of the fibers. The first and second sections are arranged to be releasably secured together to bring the bare free ends of the fibers into abutment within the bore to establish a light transmissive joint between them. The second section comprises a compression member having a tapered cavity for engaging and radially compressing the fiber retaining cone, so that the internal diameter of its bore is reduced slightly to axially align the free ends of the fibers and to frictionally hold them in place.

14 Claims, 3 Drawing Sheets

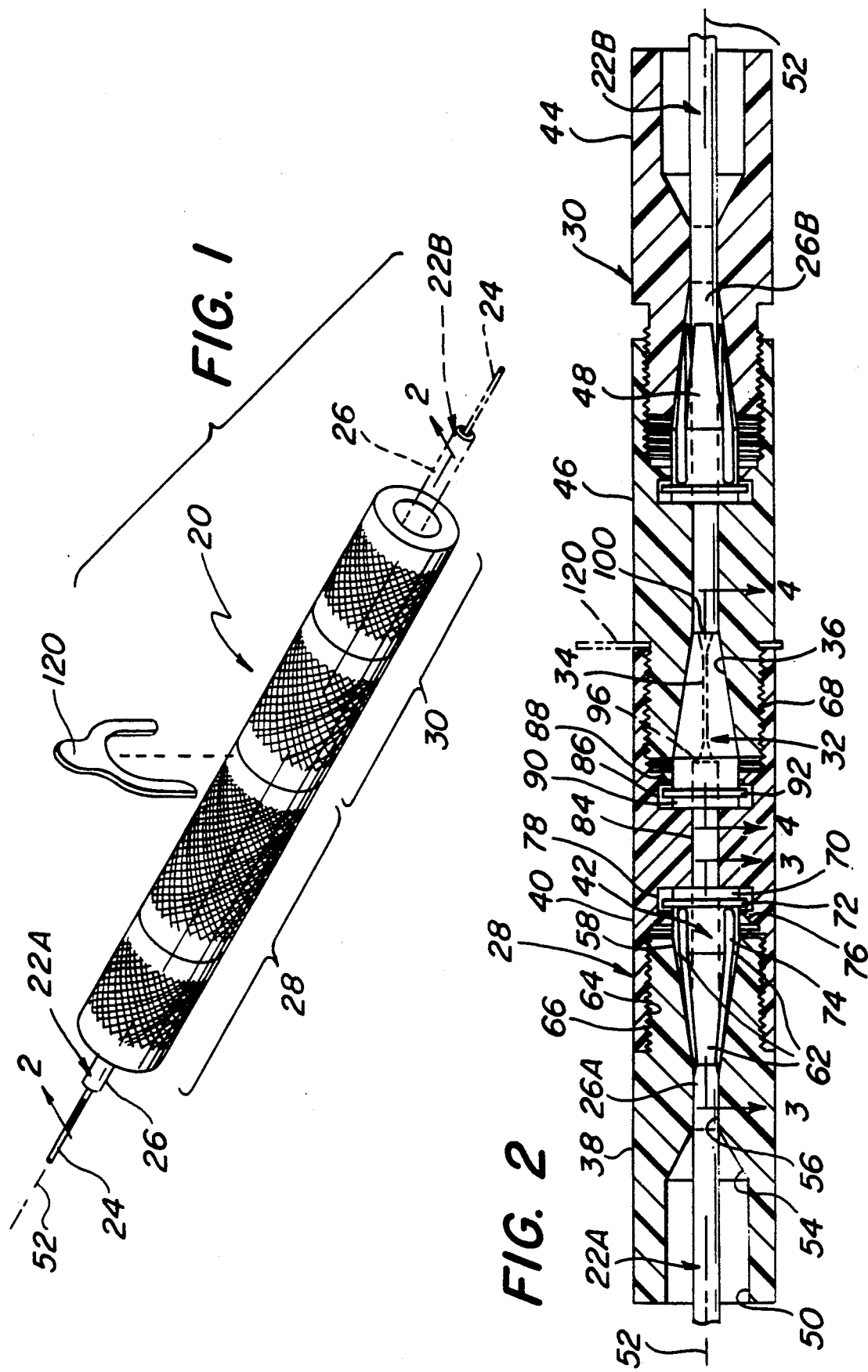

FIBER OPTIC CONNECTOR

BACKGROUND OF THE INVENTION

This invention relates generally to connectors and more particularly to connectors for optic fibers.

Connectors for optic fibers have been disclosed in the following U.S. Pat. Nos. 4,097,129 (Wellington et al), No. 4,188,087 (D'Auria et al), No. 4,212,514 (Prunier et al), No. 4,236,787 (Iacono et al), No. 4,320,938 (Gunnersen et al), No. 4,793,607 (Carlsen), No. 4,458,983 (Roberts), No. 4,767,178 (Sasaki et al), No. 4,793,683 (Cannon, Jr. et al), No. 4,807,957 (de Jong et al), No. 4,812,003 (Dambach et al), No. 4,812,006 (Osborn et al), and No. 4,838,640 (Anderton).

In the aforenoted U.S. Pat. No. 4,236,787 (Iacono et al) there is disclosed an optical fiber connector having a pair of sections, each of which is arranged to have the free end of a respective optic fiber extend therethrough. One of the sections includes an elastic compressible, cone having a bore extending therethrough and into which the bare, i.e., uncoated or unjacketed, free ends of both of the optic fibers extend to abut each other to form a light transmissive joint. The other of the sections includes an annulus which is flared outwardly in correspondence to the tapered cone. The two sections are arranged to be threadedly engaged so that cone is received in and radially compressed by the annulus to decrease the inside diameter of its optic fiber holding bore so that the fibers will be axially aligned. In one embodiment of the connector respective compressible sleeves are provided to hold or secure the jackets of the two optic fibers adjacent their bare free ends as the two sections of the connector.

In the aforenoted U.S. Pat. No. 4,097,129 (Wellington et al) there is disclosed another optic fiber connector making use of a compressible body formed of a flexible and resilient molded plastic having a mid-portion including a bore in which the free ends of the optic fibers to be joined are located. A threaded member is mounted on the compressible body to compress the mid-portion so that the optic fibers are aligned in the bore. That connector also includes two additional threaded members for compressing the ends of the body to clamp the jackets of each of the optic fibers adjacent their bare free ends.

While the aforementioned patents to Iacono et al and Wellington et al appear generally suitable for their intended purposes they never the less appear to leave something to be desired from the standpoint of functionality. In this regard the bore in the compressible cone of the Iacono et al patent appears to be almost double the external diameter of the bare optic fiber. The bore in the compressible member of the Wellington et al patent is substantially greater, e.g., 0.0005 to 0.002 inches (0.013 to 0.05 mm) than the outer diameter of the bare optic fiber. The relatively large diameter bores (as compared to the diameter of the bare optic fiber) of those patents, coupled with the soft resilient nature of the compressible members in which those bores are located may permit the free ends of the fibers to misalign or skew by digging into the material contiguous with the bores when the connectors are tightened. Moreover, the compressible members for clamping the jackets of the optical fibers of each of those connectors appear incapable of clamping both loosely buffered cables and tightly buffered cables, since the amount of inward radial movement that they can achieve is too limited. Thus, it is possible that the fibers could slip in each of each of those connectors, thereby resulting in a less-than-optimum light transmissive joint. Further still, since the jacket-clamping threaded members of the Wellington et al patent also act on the body having the optic fiber receiving bore, their tightening could result in undesired stresses or misalignment of the fiber ends within the bore. Further yet, the connector of the Welington et al patent does not permit disconnection while protecting the free (bare) ends of both optic fibers. In this regard if the connector of the Wellington et al patent is disconnected the free ends of at least one of the fibers will have to be removed from the bore in the compressible body, thereby subjecting that end to potential injury.

OBJECTS OF THE INVENTION

Accordingly, it is a general object of this invention to provide a connector and method of use which overcomes the disadvantages of the prior art.

It is a further object of this invention to provide a fiber optic connector which ensures alignment of a pair of optic fiber ends inserted therein.

It is a further object of this invention to provide a fiber optic connector which is suitable for connecting either loosely buffered optic fiber cables or tightly buffered optic fiber cables to each other.

It is a still a further object of this invention to provide a fiber optic connector which can be readily assembled and disassembled.

It is yet a further object of this invention to provide a fiber optic connector which is disconnectable, yet which protects the free ends of the optic fibers located therein.

SUMMARY OF THE INVENTION

These and other objects of this invention are achieved by providing a connector for joining the ends of a pair of optic fiber cables, be they loosely buffered or tightly buffered. Each of the optic fiber cables comprises an optic fiber having a jacket thereabout and a bare free end.

The connector comprises a first section, a second section, and a pair of jacket retaining members. Each of the first and second sections are arranged to receive a respective one of the cables, with the jacket retaining members engaging respective ones of the jackets to hold the cables in place with respect thereto. The first section has a fiber retaining member, e.g., a cone shaped member, located therein. That member is formed of a substantially hard material and includes a fiber-receiving bore extending therethrough. The internal diameter of the bore is very slightly larger, e.g., 0.0001 to 0.0002 inch, than the external diameter of the fibers.

The first and second sections are arranged to be releasably secured together to bring the bare free ends of the fibers into abutment within the bore to thereby establish a light transmissive joint between them.

The second section comprises a compression member, e.g., of mating shape to the cone, for selectively radially compressing the fiber retaining member, e.g., cone, so that the internal diameter of its bore is reduced slightly to thereby axially align the free ends of the fibers and to frictionally hold them in place.

The jacket retaining members provide additional securement and strain relief for the fibers.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is an isometric view of a fiber optic connector constructed in accordance with this invention;

FIG. 2 is an enlarged sectional view taken along line 2—2 of FIG. 1;

DETAILED DESCRIPTION OF THE PREFERRED EMBODIMENT

Figure 3:
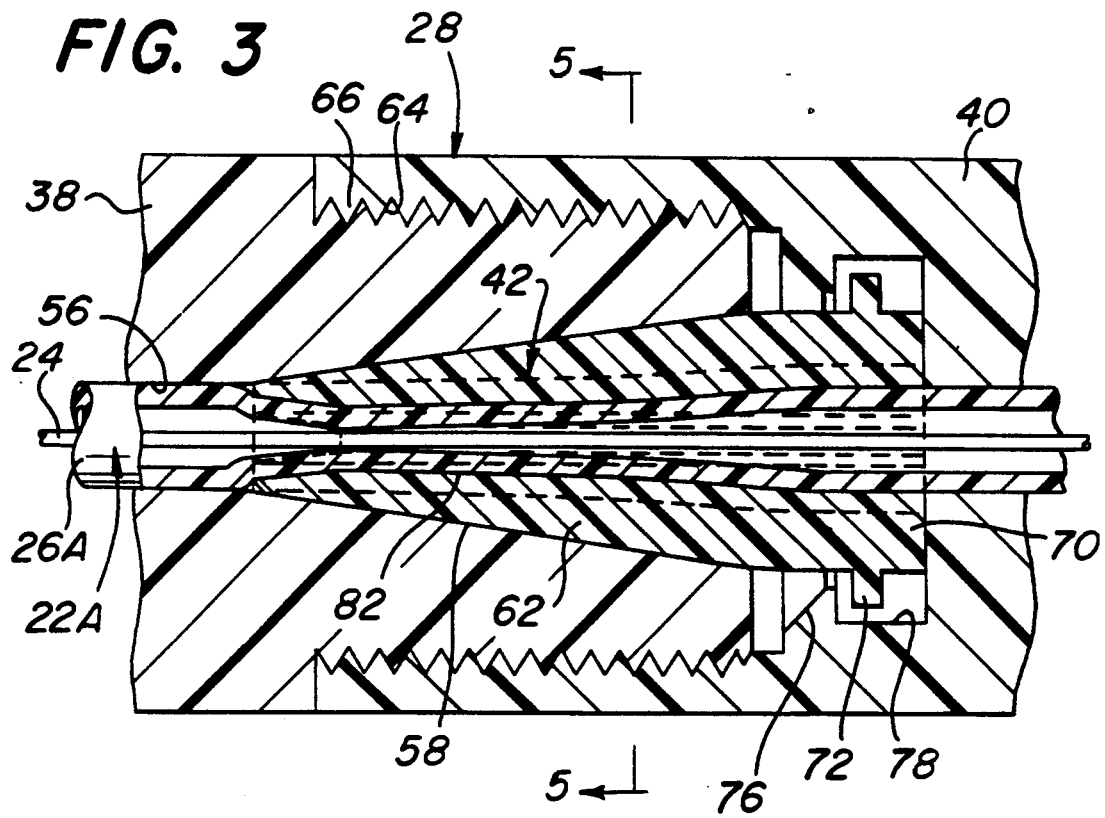
FIG. 3 enlarged sectional view taken along line 3—3 of FIG. 2.

Referring now to the various figures of the drawing wherein like reference characters refer to like parts, there is shown at 20 in FIG. 1, a fiber optic connector 25 constructed in accordance with this invention. The connector 20 is arranged to connect the ends of a pair of optic fibers forming respective portions of cables 22A and 22B in a good light transmissive, separation-resistant joint. The connector 20 can be used with either tightly buffered fiber cables, i.e., optic fibers having a coating or cladding directly thereon, or loosely buffered fiber cables, i.e., optic fibers whose cladding is spaced from the fiber itself so that the fiber "floats free" within the cladding. In the embodiment shown herein the optic fiber cables 22A and 22B are loosely buffered. Thus, each comprises a light transmissive fiber 24 freely spaced within an outer jacket or cladding 26.

For reasons to be described later in order to connect the ends of the fibers 24 of the two cables together in a good light transmissive joint within the connector 20, the cladding 26 on the free (i.e., cleaved) end of each fiber is removed to leave a precise length of the fiber 24 exposed.

Figure 4:
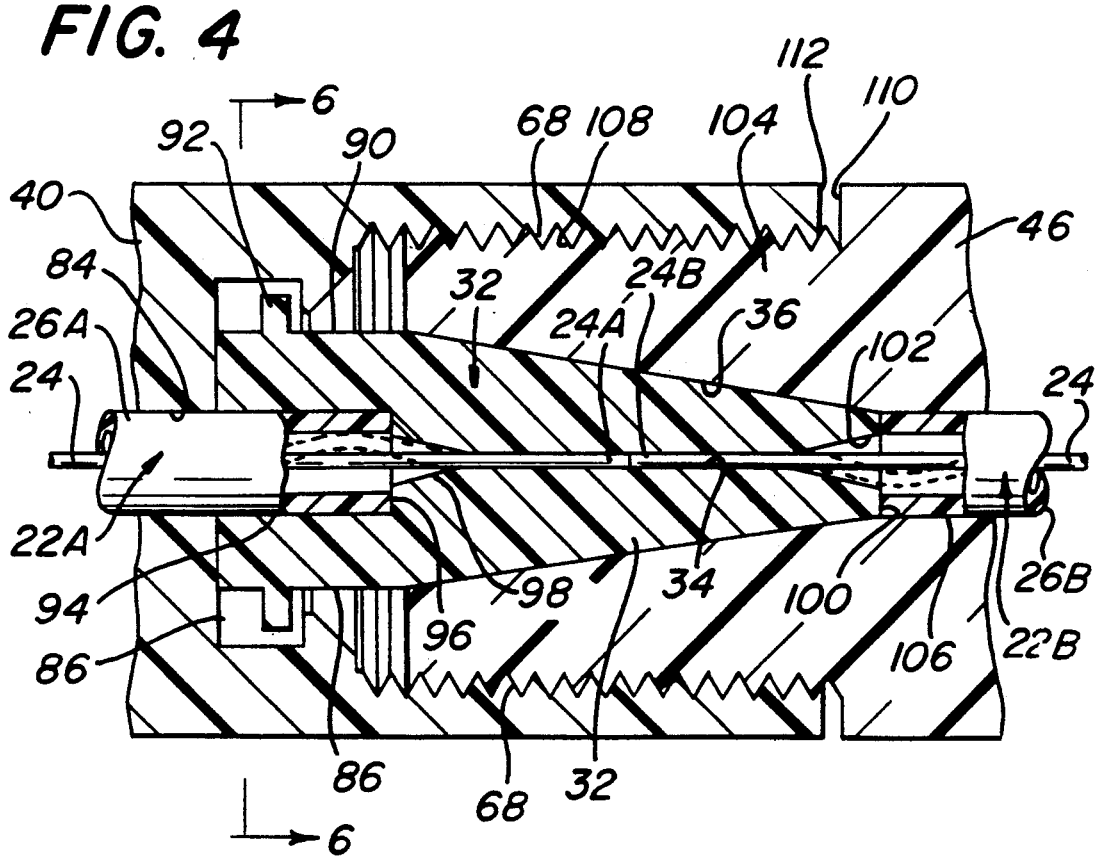
FIG. 4 is an enlarged sectional view taken along line 4—4 of FIG. 2.

As can be seen clearly in FIG. 4 in the embodiment shown herein the cleaved free end of the fiber 24 of cable 22A is designated by the reference number 24A, while the cleaved free end of the fiber 24 of the cable 22B is designated by the reference number 24B. In a similar manner the cladding on the cable 22A is designated by the reference number 26A, while the cladding on the cable 22B is designated by the reference number 26B.

Referring now to FIGS. 1, 2 and 4 it can be seen that the connector 20 basically comprises a pair of fiber-holding connector sections 28 and 30 each formed of any suitable material, e.g., plastic. The connector section 28 is arranged to receive and hold the end of cable 22A therein, while the connector section 30 is arranged to receive and hold the end of cable 22B therein. The connector sections are arranged to be releasably secured to each other to connect the two optic fibers ends 24A and 24B together. Thus, the connector section 28 includes an alignment bushing 32. The details of the bushing 32 will be described later. Suffice it for now to state that it includes a fiber alignment channel 34 for receipt of the free ends 24A and 24B so that they can abut therein in a good light transmissive joint. The alignment bushing 32 is arranged to be received within a matingly shaped cavity 36 (to be described later) forming a portion of the connector section 30, so that when the connector sections 28 and 30 are secured together and tightened (as will also be described later) the bushing 32 is compressed slightly radially to cause the inner surface of its channel 34 to tightly engage the free ends 24A and 24B of the optic fibers to precisely align them axially.

Each of the connector sections includes guide means for guiding an associated cable end therein, and a gripping means for gripping the cladding on the cable to thereby hold the cable ends in place and thereby prevent the connected fiber ends from separating. In particular the connector section 28 includes a guide member 38 which forms the means for guiding the cable 22A into the connector section 28, and a housing member 40 loosely supporting a gripping member 42 therein. The gripping member 42 forms the means for gripping the cladding 26A on the cable 22A. In a similar manner the connector section 30 includes a guide member 44 which forms the means for guiding the cable 22B into the connector section 30, and a housing member 46 loosely supporting a gripping member 48 therein. The gripping member 48 forms the means for gripping the cladding 26B on the cable 22B.

The guide member 38 is arranged to be releasably secured, e.g., threadedly engaged, to the housing member 40 to form the connector section 28, while the guide member 44 is arranged to similarly releasably secured to the housing member 46 to form the connector section 30. When so connected the gripping member 42 is located within the interior of the connector section 28 at the interface of the guide member 38 and housing member 40, while the gripping member 48 is similarly located within the connector section 30 at the interface of its guide member 44 and its housing member 46. The housing member 40 of connector section 22A is arranged to be releasably secured to the housing member 46 of the connector section 22B by any suitable means, e.g., screw threads (to be described later), to releasably secure the two connector sections 28 and 30 to each other. As will be described later, such securement effects the heretofore mentioned compression of the alignment bushing onto the abutting fiber ends.

Referring now to FIG. 2 the details of the guide member 38 will now be described. As can be seen therein the guide member 38 comprises a cylindrical body having a large diameter bore 50 in its free end of the guide member to serve as an entrance port for the cable 22A. The bore 50 is centered on the central longitudinal axis 52 of the connector 20. This axis is also the central longitudinal axis of the fiber ends 24A and 24B being connected. The bore 50 merges in a conical intermediate surface 54 which tapers down to a small diameter bore 56. The central longitudinal axis of the conical surface 54 and the small diameter bore 56 are also coaxial with the central longitudinal axis 52. The inner end of the small diameter bore 56 merges into a conically shaped cavity 58. The cavity 58 is arranged to receive the gripping member 42 therein when the gripping member 38 is secured to the housing member 40.

The details of the gripping member will be described later. Suffice it for now to state that the gripping member 38 is a cylindrical collet-like member having a central passageway 60 (FIG. 5) coaxial with the central longitudinal axis 52 of the connector 20 and which is formed between plural spaced fingers 62. The central passageway 60 is arranged to receive the optic cable 22A therethrough. The outer profile of the collet-like gripping member corresponds the conical shape of the cavity 58, so that when the guide member 38 and housing member 40 are screwed together the outer surface of the gripping member engages, i.e., slides along, the inner surface of the cavity 58 to cause the fingers 62 to tightly grip the cladding 26A on the cable 22A.

In order to releasably secure the guide member 38 to the housing member 40, the guide member includes an externally threaded annular recess 64 (FIGS. 2 and 3) in its outer periphery at the inner end of the guide member. The housing member 40 includes an internally threaded central bore 66 (FIGS. 2 and 3) at one end which is arranged to mate with the threads on the guide member 38. A second, similar, threaded central bore 68 (FIGS. 2 and 4) is provided at the opposite end of the housing member 40. The threads forming the central bore 68 are arranged to mate with threads (to be described later) on the body member 46 to secure the two body members, and hence the two connector sections, together.

As mentioned earlier the gripping member 42 basically comprises a collet-like member. In particular, as can be seen clearly in FIGS. 2-5, it comprises a cylindrical body having one end 70 of circular cylindrical shape. An annular, retaining flange 72 extends about the periphery of the end 70. The opposite end of the gripping member is conical in shape and includes four, longitudinally oriented slots 74, which form therebetween the heretofore mentioned fingers 62. The fingers extend longitudinally and are equidistantly spaced from one another about the axis 52. The conical outer surface of the fingers 62 corresponds to the conical inner surface of the cavity 58 of the guide member 38.

The gripping member 42 is secured, albeit loosely (as will be described hereinafter) to the body member 28 so that its fingers 62 extend into the hollow interior of the threaded bore 64 for mating engagement with the inner surface of the cavity 58 of the guide member. In particular, the housing member 40 includes a central conical bore 76 (FIGS. 2 and 3) for the cylindrical portion of the gripping member 42 to extend freely therethrough. A central circular cavity 78 communicates with the bore 76 and serves to receive the end 70 of the gripping member 42. The internal diameter of the cavity 78 is larger than the external diameter of the flange 72, and the external diameter of the flange 72 is larger than the internal diameter of the smaller diameter end of the bore 76, so that the gripping member is free to slide longitudinally along the central axis 52 of the connector 20 and to pivot slightly with respect thereto, but is precluded from falling out of the threaded bore 68. This feature facilitates the insertion of the cable through the gripping member (as will be described later).

Figure 5:
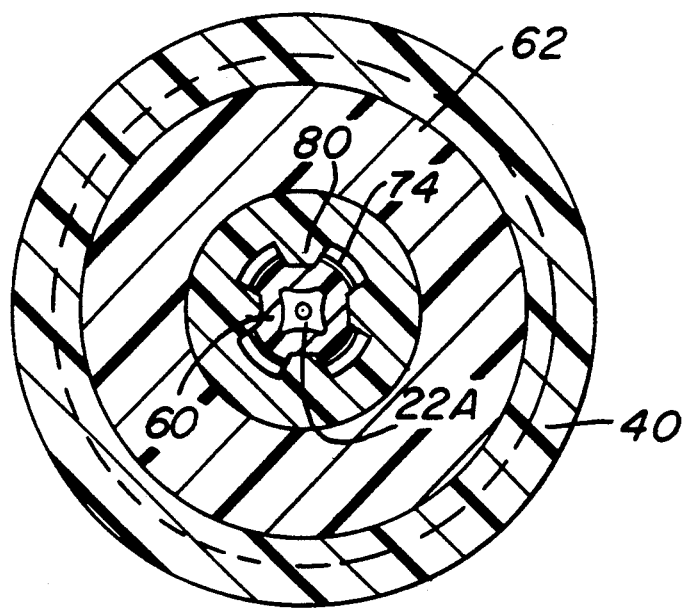
FIG. 5 is a sectional view taken along line 5—5 of FIG. 3.
Figure 6:
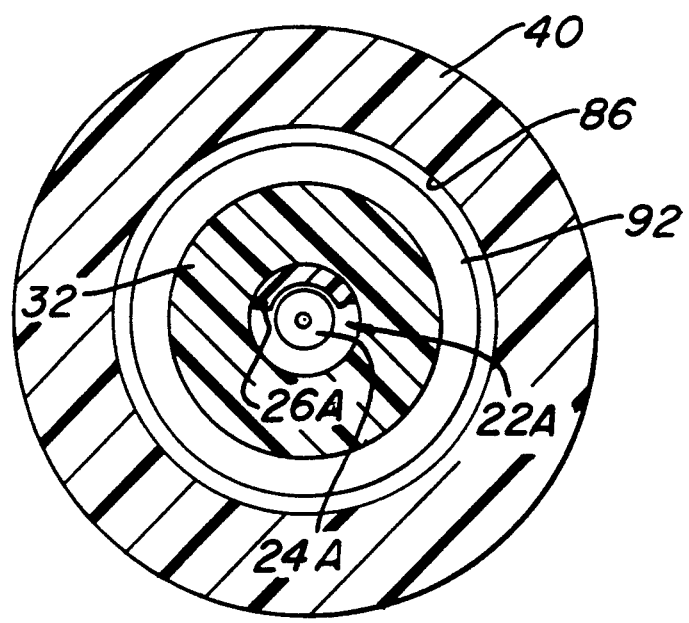
FIG. 6 is a sectional view taken along line 6—6 of FIG. 4.

As can be seen clearly in FIG. 5 the inner surface of each of the fingers 62 is in the form of a longitudinally extending rib 80. The inner surface 82 of each rib is of circular cross section in a direction perpendicular to the longitudinal axis 52. Each rib is arranged to be flexed inward radially when the guide member 38 and housing member are tightly screwed together (as will be described later). At that time, the inner surface 82 of each of the ribs 80 engages a longitudinally extending portion of the outer periphery of the cladding 26A and forces it radially inward. This action has the effect of centering the optic fiber 24 somewhat within the cladding and, in fact, the flexing of the ribs may actually collapse the cladding into contact with the fiber to precisely center the fiber. In any case the action of the fingers in tightly griping the cladding prevents its longitudinal movement and thereby acts as a strain relief device for the associated cable when the connector is fully assembled.

The guide member 30, and the gripping member 48 of the connector section 30 are constructed in a similar manner to the guide member 28 and the gripping member 42 of the connector section 28 as described heretofore. Hence in the interests of brevity the construction of those identical components will not be reiterated. Moreover, the housing member 40 of connector section 28 is of identical construction to the housing member 46 of connector section 30 except for their inner ends, i.e., the portions which support and/or cooperate with the alignment bushing 32. Hence, the identical components of the housing members 40 and 46 will also not be reiterated hereafter.

As can be seen in FIGS. 2 and 4 the mid-portion of the housing member 40 includes a central passageway 84 which is in communication with the circular cavity 78. The inner end of the passageway 84 opens to a second circular cavity 86, which is identical in construction to the cavity 78. The inner end of the cavity 86 opens to a conical central 88, which is identical in construction to the bore 76. The inner end of the bore 88 opens into the hollow threaded interior bore 68, which in turn is identical in construction to the threaded interior bore 66.

The alignment bushing 32 is of the same general outer profile as the gripping member 42. Thus, it includes a circular cylindrical portion 90 having an annular flange 92 projecting about its outer periphery. The cylindrical portion 90 of the alignment bushing extends through the conical bore 88, so that the alignment bushing can slide an pivot in a similar manner to the gripping member 42. The flange 92 retains the alignment bushing within the threaded bore 68.

Unlike the gripping member 42 the alignment bushing is a generally solid-bodied member. It does however include the heretofore mentioned fiber alignment channel 34. The alignment channel is centered coaxially with the central longitudinal axis of the connector. The entrance to one end of the channel 34 is provided by a cylindrical passageway or bore 94. The bore extends for a short distance into the body of the alignment bushing and terminates in a back wall or stop surface 96. A conical entranceway or mouth 98 to the channel 34 is located in the back stop surface 96. Thus, as will be described later when the end of cable 22A is inserted within the connector section 28, the end of the cladding 26A will abut the stop surface 96, while the bare end portion of the fiber 24 extends through the flared mouth 98 into the channel 34 so that its cleaved end 24A is located at a desired position, e.g., centered or slightly beyond the center of the channel, with the later position being preferable if the cable is loosely buffered (for reasons to be described later).

The free end of the alignment bushing 32 includes a flat surface 100, which serves as a stop surface for the cladding 26B of the cable 22B, when that cable is inserted through the connector section 30, as will be described later. A second flared entranceway or mouth 102 is provided in the alignment bushing. This mouth is identical in shape to the mouth 98 and is located in the free end of the alignment bushing so that it is in communication with the opposite end of the channel 34 than the mouth 98.

In accordance with a preferred aspect of this invention the fiber alignment channel is of very close tolerance to the bare fiber ends extending therein. In particular, it is preferred that the diameter of the channel is only very slightly larger, e.g., 0.0001 inch (0.025 mm) to 0.0002 inch (0.05 mm), than the diameter of the optic fiber 24. The optic fiber can be any diameter, e.g., 125 microns. This feature ensures that when the connector sections 28 and 30 are secured together, as will be described later, the alignment bushing need only be compressed slightly radially to cause the inner periphery of the channel 34 to tightly grip the fiber ends 24A and 24B to hold them together in precise axial alignment. Moreover, it is preferred that the alignment bushing be formed of a relatively hard, albeit slightly compressible, material, e.g., glass filled polyester resin. Such a hard material ensures that the fiber ends cannot become skewed and dig into the material of the alignment bushing forming the channel wall as it is compressed, as is the case of prior art alignment devices making use of relatively soft materials and having low tolerance alignment channels formed therein As can be seen clearly in FIGS. 2 and 4 the means for effecting the slight radial compression of the alignment bushing 32 comprises the heretofore mentioned cavity 36. This cavity is of mating shape to the outer profile of the alignment bushing and is located within the free end 104 of the housing member 46 of the connector section 30 and is centered on the longitudinal axis 54. The cavity is arranged to receive the alignment bushing when the two connector sections 28 and 30 are threadedly secured together. The inner end of the cavity 30 communicates with a central passageway or bore 106 through which the cable 22B extends. To that end the inner diameter of the passageway is just slightly larger than the external diameter of the cladding 26B of the cable 22B. When the alignment bushing is located within the cavity 36 its free end stop surface 100 is located at the end of the passageway 106. Accordingly when the cable 22B is extended through the connector section 30 the end of the cladding 26A abuts the stop surface 100 at the free end of the alignment bushing, while the bare fiber 24 extends through the entrance mouth 102 into the fiber alignment channel 34 so that its cleaved end 24B abuts the cleaved end 24A of the other cable 22A. If the cable 22B is loosely buffered the portion of the fiber 24 extending beyond the end of its cladding 26A is slightly longer than the distance between the end of the cladding and the center of the channel 34 (for reasons to be described later).

As best seen in FIG. 4 the outer periphery of the free end 104 of the housing member 46 includes an externally threaded recess 108 which is arranged to be screwed into the threaded bore 68 in the housing member 40 of the connector section 28. The root of the threaded recess 108 of the housing member 46 includes a planar annular stop surface 110. This surface is arranged to abut a planar stop surface 112 forming the free end of the housing member 40 of the connector section 28 when the two connector sections are secured together to effect the compression of the alignment bushing onto the abutting fiber ends.

Operation of the connector 20 for connecting loosely buffered cables together is as follows: The section 28 is assembled by screwing its guide member 38 into the housing member 40 to the point at which they are connected together, but not to the point that the conical surface 58 has slid over the conical outer surface of the fingers to cause them to flex inward to a position so that the diameter between their diametrically opposed surfaces 82 is less than the outer diameter of the cladding 26A on the cable 22A. The sections 30 is then assembled in a similar manner. Then the sections 28 and 30 are threadedly secured together until there is a predetermined small space separating the stop surfaces 112 and 110, respectively. An optional spacer element 120 (FIGS. 1 and 2) can be used to ensure the correct spacing is achieved. The connector 20 is now ready to receive the cables 22A and 22B. Thus, the stripped end of cable 22A is inserted into the entrance port 50 through passageway 56 into the space between the inner surfaces on the ridges of the fingers 62, through the central passageway in the gripping member, through bore 84, and into and through bore 94 in the alignment bushing, until the end of the cladding 26A abuts the stop surface 96. By the time that has occurred the extending portion of the bare fiber 24 will have entered the mouth 98 of the alignment channel 34 and passed therethrough until its cleaved end 24A is located at the desired position within the channel, e.g., slightly beyond the mid-point thereof.

The guide member 38 is then screwed more tightly into the housing member 40 while holding the housing member stationary to cause the inner surface of the cavity 58 to slide over the outer conical surface of the fingers 62 to cause them to flex inward radially. This action forces the inner surfaces 82 of the ridges 80 on the fingers to collapse the cladding 26A, whereupon the fiber 24 is centered within the cladding, and the cable is prevented from sliding out of the connector section 28. Since the gripping member 42 is loosely mounted within the housing member 40 the gripped jacket 26A will not be twisted as the guide member 38 is screwed into the housing member 40. Moreover, by virtue of the fact that the bare (cleaved) end 24A of the cable 22A is located within the alignment channel 34 it is protected from damage even though the connector sections 28 and 30 have not yet been connected together.

The cable 22B is then inserted into the connector section 30 in the same manner as described with reference to the insertion of cable 22A into connector section 28. Thus, when the end of the cladding 26B abuts the flat stop surface 100 at the free end of the alignment bushing 32 the cleaved end 24B of the fiber 24 will have entered the mouth 102 and into the alignment channel so that it abuts the cleaved end 24A of the other fiber.

The spacer member 120, if used, is then removed and the sections 28 and 30 screwed tightly together until their stop surfaces 112 and 110, respectively, abut, all the while inward pressure should be provided on the cable 22B. This action ensures that the free end of fiber 24B of cable 22B abuts the free end of fiber 24A of the cable 22A at the middle of the channel 34. The tightening of the sections 28 and 30 together causes the inner conical surface of the cavity 36 to slide over the mating outer surface of the alignment bushing 32 to effect the radial compression thereof, as described heretofore, thereby locking the fiber ends 24A and 24B in precise axial alignment to form a good light transmissive joint therebetween. In this regard when the sections 28 and 38 are screwed tightly together the flat rear surface of the alignment bushing 32 abuts (is seated on) the bottom wall of the bore 86, a shown in FIG. 4, to ensure that the bushing's alignment channel 34 is axially aligned with the central longitudinal axis 52.

The housing member 46 and the guide member 44 are then screwed tightly together in the same manner as described with reference to members 38 and 40 so that the gripping member 48 engages the cable 22B in the same manner as described with reference to cable 22A.

If, as is preferred (albeit not mandatory), the bare end of each fiber 24 is slightly longer than the distance from the end of its cladding to the mid-point of the alignment channel, when the connector 20 is assembled as described above the portions of the fibers 24 between the gripping members and the alignment channel 34 will bow slightly within their cladding at those places, thereby applying some axial force on the fiber ends 24A and 24B tending to hold them together. When the connector 20 is used with tightly buffered cables the ends of the fibers 24 are preferably stripped of cladding to the precise length equal to the distance from the mid-point of the channel 34 to the cladding stop surfaces 96 and 100.

The connector 20 is arranged to be readily disconnected without having to remove the cables therefrom. This is accomplished by merely unscrewing the connector sections 28 and 30 from each other. When this is done the optic fiber cables 22A and 22B will never the less still be held in precise position within the connector sections 28 and 30, respectively, with the delicate free ends of their fibers 24 being protected from injury. In this regard when the connector sections are disconnected from each other the cleaved end 24A of the cable 22A will be located within the alignment channel 32 in the alignment bushing, while the cleaved end 24B of the cable 22B will be located within the cavity 36 in the housing member 46. Accordingly, each fiber end will be held in a retracted position, wherein some portion of the connector 20 will protect it from injury.

It should be pointed out at this juncture that various structural components of the connector 20 can be modified within the scope of this invention. For example other fastening means can be used in lieu of the conventional screw threads described above. Such alternative means may comprise short lengths of double lead threads, such as those which make up a conventional luer lock, or may comprise bayonet components.

Without further elaboration, the foregoing will so fully illustrate our invention that others may, be applying current or future knowledge, adopt the same for use under various conditions of service.

We claim:

1. A connector for a pair of optic fiber cables, each of said cables comprising an optic fiber having a jacket thereabout and a bare free end, said connector comprising a first section, and a second section, said first section and second section each being arranged to receive a respective one of said cables, said first section comprising a fiber retaining member formed of a material resistant to penetration by the bare free ends of said optic fibers and having a fiber receiving bore extending therethrough, said bore being larger in internal diameter than the external diameter of said bare free ends of said optic fibers so that said bare free ends of said optic fibers can be freely inserted therein and held by said bore in substantial axial alignment, each of said first and second sections having a longitudinal axis and being securable together by the application of opposed longitudinal forces to said sections, said longitudinal forces being directed along said axes to bring said bare free ends of said fibers into abutment within said bore and thereby establish a light transmissive joint therebetween, said second section comprising a compression member engagable with said fiber retaining member when said sections are secured together, whereupon the application of said opposed longitudinal forces to said sections selectively radially compresses said fiber rataining member so that the internal diameter of said bore is reduced thereby precisely axially aligning said free ends of said fibers and frictionally holding said free ends in place.

2. The connector of claim 1 additionally comprising a pair of jacket retaining members, with said jacket retaining members engaging respective ones of said jackets to hold said cables in place with respect thereto, and wherein each of said jacket retaining members includes plural flexible fingers for engaging portions of the periphery of an associated jacket.

3. A connector for a pair of optic fiber cables, each of said cables, each of said cables comprising an optic fiber having a jacket thereabout and a bare free end, said connector comprising a first section, and a second section, said first section and said second section each being arranged to receive a respective one of said cables, said first section having a fiber retaining member located therein, said fiber retaining member having a fiber receiving bore extending therethrough, said bore being larger in internal diameter than the external diameter of said fibers, said first and second sections being securable together to bring said bare free ends of said fibers into abutment within said bore to establish a light transmissive joint therebetween, said second section comprising a compression member engagable with said fiber retaining member when said sections are secured together for selectively radially compressing said fiber retaining member, whereupon the internal diameter of said bore is reduced to axially align said free ends of said fibers and to frictionally hold said free ends in place, said sections being disconnectable from each other, with said free ends of said cables being recessed within portions of said sections to protect said free ends from damage.

4. A connector for a pair of optic fiber cables, each of said cables comprising an optic fiber having a jacket thereabout and a bare free end, said connector comprising a first section, and a second section, said first section and said second section each being arranged to receive a respective one of said cables, said first section having a fiber retaining member located therein, said fiber retaining member having a fiber receiving bore extending therethrough, with the internal diameter of said bore being within the range of 0.0001 to 0.0002 inch (0.0025 to 0.005 mm) larger than the external diameter of said fibers, said first and second sections being securable together to bring said bare free ends of said fibers into abutment within said bore to establish a light transmissive joint therebetween, said second section comprising a compression member engagable with said fiber retaining member when said sections are secured together for selectively radially compressing said fiber retaining member, whereupon the internal diameter of said bore is reduced to axially align said free ends of said fibers and to frictionally hold said free ends in place.

5. A connector for a pair of optic fiber cables, each of said cables comprising an optic fiber having a jacket thereabout and a bare free end, said connector comprising a first section, a second section, said first section and said second section each being arranged to receive a respective one of said cables, said first section having a fiber retaining member located therein, said fiber retaining member having a fiber receiving bore extending therethrough, said fiber retaining member is formed of glass filled polyester resin, said first and second sections being securable together to bring said bare free ends of said fibers into abutment within said bore to establish a light transmissive joint therebetween, said second section comprising a compression member engagable with said fiber retaining member when said sections are secured together for selectively radially compressing said fiber retaining member, whereupon the internal diameter of said bore is reduced to axially align said free ends of said fibers and to frictionally hold said free ends in place.

6. The connector of claim 1 wherein said fiber retaining member is conical in shape and wherein said compression member comprises a cavity which is complementary in shape to said conical fiber retaining member for engaging the periphery of said conical fiber retaining member to compress it.

7. A connector for a pair of optic fiber cables, each of said cables comprising an optic fiber having a jacket thereabout and a bare free end, said connector comprising a first section, a second section, said first section and said second section each being arranged to receive a respective one of said cables, said first section having a fiber retaining member located therein, said fiber retaining member having a fiber receiving bore extending therethrough, said connector including a longitudinal axis, said fiber retaining member being mounted for longitudinal movement within said first section, said first and second sections being securable together to bring said bare free ends of said fibers into abutment within said bore to establish a light transmissive joint therebetween, said second section comprising a compression member engagable with said fiber retaining member when said sections are secured together for selectively radially compressing said fiber retaining member, whereupon the internal diameter of said bore is reduced to axially align said free ends of said fibers and to frictionally hold said free ends in place.

8. The connector of claim 2 wherein each of said jacket retaining members comprises a conical clamping member and a cooperating compression member, said conical clamping member including said fingers, said cooperating compression member comprising a cavity shaped complementary to said conical clamping member for engaging the periphery of said conical member to cause said fingers to flex inward radially.

9. The connector of claim 1 wherein each of said sections includes a wall portion for engaging the end of the jacket at said bare end of said fiber.

10. The connector of claim 1 wherein said sections are arranged to be disconnected from each other, with said free ends of said cables being recessed within portions of said sections to protect said free ends from damage.

11. The connector of claim 1 wherein said internal diameter of said bore is within the range of 0.0001 to 0.0002 inch (0.0025 to 0.005 mm) larger than the external diameter of said fibers.

12. The connector of claim 1 wherein said fiber retaining member is formed of glass filled polyester resin.

13. The connector of claim 1 wherein said connector includes a longitudinal axis and wherein said fiber retaining member is mounted for longitudinal movement within said first section.

14. The connector of claim 13 wherein said fiber retaining member is conical in shape and wherein said compression member comprises a cavity which is complementary in shape to said conical fiber retaining member for engaging the periphery of said conical fiber retaining member to compress it.

* * * * *